United States Patent Office 3,472,879
Patented Oct. 14, 1969

3,472,879
1,3-BIS(HYDROXY PHENYL)-2-METHYLENE PROPANES AND 2-METHYL-2-(ORTHO HYDROXYBENZYL)-2,3-DIHYDRO-BENZOFURANS
Arsène Isard, Saint-genis-Laval, and Francis Weiss, Pierre-Benite, France, assignors to Ugine Kuhlmann, Paris, France, a French company
No Drawing. Filed Dec. 28, 1966, Ser. No. 605,175
Claims priority, application France, Dec. 29, 1965, 44,167; May 17, 1966, 61,871
Int. Cl. C07c 87/48, 39/04; C07d 5/34
U.S. Cl. 260—346.2                       17 Claims

ABSTRACT OF THE DISCLOSURE

Isomeric rearrangement of 1,3-bis-(aryloxy)2-methylene propane produces a corresponding phenol of the formula

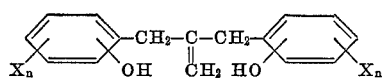   (I)

or a coumaran of the formula

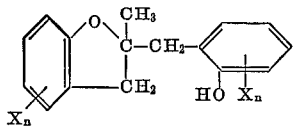   (II)

In both Formulas I and II, X may be an alkyl containing 1 to 12 carbon atoms, an aryl, an alkoxy, a hydroxy, a formyl, an amine or a nitro group, or it may be a halogen atom. $n$ is zero or an integer from 1 to 4. In Formula I the hydroxy group (—OH) occupies either the ortho- or the para-positions of the aromatic rings. When the hydroxy groups occupy the para-positions, $n$ is at least two and the two X groups in each aromatic ring occupy the meta positions. The diphenols may be used as intermediates for the preparation of polyesters, polyethers and polycarbonate resins. The coumarans (i.e. 2,3-dihydrobenzofurans) may be used as intermediates for the preparation of herbicides, fungicides and parasiticides.

BACKGROUND OF THE INVENTION

Field of the invention

This invention relates to isomeric rearrangement of 1,3-bis-(aryloxy)2-methylene propane to produce novel diphenols and coumarans.

Description of the prior art

Claisen rearrangements of aryl allyl ethers such as the rearrangements of phenyl allyl ether to o-allyl phenol and 2,6-dimethylphenol allyl 3 ether to p-allyldimethylphenol are well known. The rearrangement is characterized by the presence of an allylic double bond for each aryl ether group.

SUMMARY OF THE INVENTION

We have found that thermal rearrangement of 1,3 di-(aryloxy)2-methylene propanes, a group of compounds having only one allylic double bond for two aryl ether groups, may be successfully carried out to produce novel isomeric diphenols or coumarans. According to the invention, the method of isomerically rearranging 1,3 di(aryloxy)2-methylene propane comprises heating the diaryloxy methylene propane at a temperature in the range of about 150°–300° C. to promote an isomeric rearrangement. The diaryloxy methylene propane has the general formula

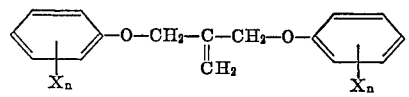   (III)

wherein (a) X is selected from the group consisting of alkyl containing 1 to 12 carbon atoms, aryl, alkoxy, hydroxy, formyl, halogen atoms, amine radicals, and nitro radicals, (b) $n$ is zero or an integer from 1 to 4, and (c) at least one of the ortho positions or the para-position in each of the two aromatic rings is occupied by a hydrogen atom. When both ortho positions are substituted by X groups, the para-positions in the aromatic rings must be occupied by hydrogen atoms.

The product of the thermal isomeric rearrangement conforms to at least one of the following formulas

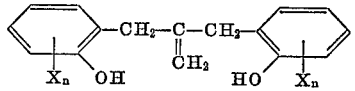   (IV)

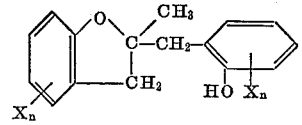   (V)

and

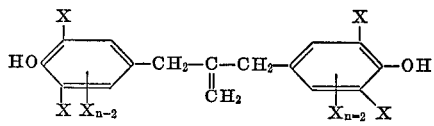   (VI)

wherein X and $n$ have the same meaning as depicted hereinabove.

The new compounds of this invention have a number of applications. They may be used as antioxidants. They may also be used as polymerization inhibitors. More specifically, the diphenols may be used as intermediates for the preparation of polyesters, polyethers and, polycarbonate resins, and the coumarans may be used as intermediates for the preparation of herbicides, fungicides, and parasiticides.

DESCRIPTION OF THE PREFERRED EMBODIMENTS

The present invention is based on the discovery that by heating a compound which conforms to the general structure (III) an isomeric rearrangement is provoked which leads to the formation of an isomeric diphenol of structure (IV) or (VI), or a substituted monophenol with coumaran structure as illustrated by Formula V. Although the thermal isomeric rearrangement of this invention in certain aspects is similar to Claisen rearrangements described hereinabove, the results of the thermal reaction, however, cannot be predicted on the well known Claisen rearrangement mechanism. As previously stated, the starting materials, 1,3 di-(aryloxy)2-methylene propanes, of this invention have only one allylic double bond for two arylether groups:

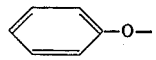

The double bond, therefore, must participate in the rearrangements of both arylether groups.

The exact rearrangement mechanism of the present invention is not certain. It may be postulated that the double bond participates in the rearrangement of both arylether groups successively, which may be represented by the following equations in which one of the ortho positions in each ring is non-substituted.

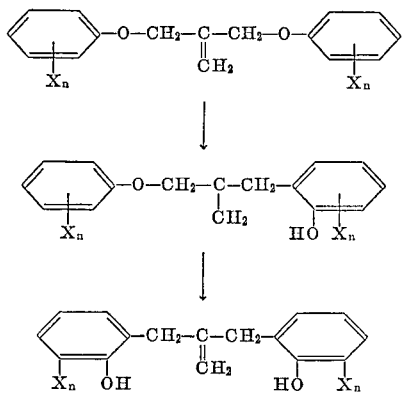

The thermal rearrangement of diarylethers of the following structure

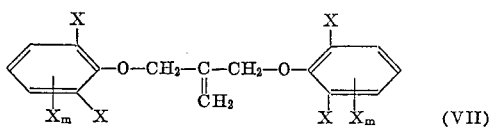

wherein X has the same meaning as depicted hereinabove, $m$ is zero or an integer from 1 to 2 and the para-positions are non-substituted, leads to the formation of 1,3-bis-(parahydroxyaryl)2-methylene propane of the Formula VI. The double rearrangement into para-paradiphenols when the ortho positions are substituted in diarylethers (VII) tends to follow the same reaction mechanism postulated hereinabove.

The formation of the 2-methyl-2-(o-hydroxy-benzyl) coumarans of the Formula V is the result of a cyclization which adds one of the hydroxy groups on the double olefinic bond. The cyclization can only be realized when the hydroxy groups (—OH) are in the ortho positions. The para-para diphenol will not form a coumaran.

The diphenols of the Formulas IV and VI are prepared by conducting the thermal isomeric rearrangement of 1,3-diaryloxy 2-methylene propanes in the presence of an amine at a temperature in the range of about 150°–300° C. The suitable amines include aliphatic and cycloaliphatic tertiary amines, such as triethylamine, tributylamine, N-N-dimethyldodecylamine, N-N-dimethyl cyclohexylamine; heterocyclic tertiary amines such as N-alkyl pyrrolidines and N-alkylpiperidines in which the alkyl groups contain 1 to 8 carbon atoms; aromatic tertiary amines such as N-N-dimethylaniline, and N-N-diethylaniline; pyridine and its alkyl homologous compounds; picolines; and quinoline. In the reaction, about 0.2 to 5 parts by weight of the amine per each party by weight of the diarylether is used. Preferably the ratio is maintained in the range of 0.5 to 2 parts of the amine for each part of the diarylether.

The reaction is generally performed under atmospheric pressure. However, when amines which have a normal boiling temperature below the reaction temperature are used, the reaction preferably is carried out under pressure in a reactor such as an autoclave. The pressure should be sufficient to keep the products in the liquid phase.

The ortho-ortho diphenols thus obtained may be further transformed into coumarans by treating them with an acidic catalyst, for example, a trace amount of a strong inorganic acid such as hydrochloric, sulfuric and phosphoric acids. The further transformation may also be accomplished by heating the ortho-ortho diphenols at a temperature in the range of about 150°–300° C. without any catalyst.

Advantageously, the isomeric coumarans are prepared by a direct thermal rearrangement of 1,3 diaryloxy 2-methylene propanes of the type that are at least one of the ortho positions in each aromatic rings is not substituted.

The direct rearrangement reaction is carried out without the use of any solvent or in a neutral solvent. Suitable neutral solvents include hydrocarbons such as diphenyl, tetraline, paraffin oils and kerosene. These solvents may be used singularly or in the form of a mixture. The direct transformation probably is due to the presence of a trace amount of acidic compounds including the phenolic compounds themselves. In any event, we have found that isomeric coumarans can be prepared directly by heating the diarylether alone or in the presence of a neutral solvent.

Further to illustrate this invention, specific examples are described hereinbelow:

EXAMPLE 1

Preparation of 2-methyl 2-(o-hydroxybenzyl) coumaran 8 g. of 1,3-diphenoxy 2-methylene propane were heated for 8 hours at 180°–220° C., then the reaction mass was distilled under a pressure of 1 mm. mercury. A main fraction of 5.8 g., boiling at 135°–137° C., was obtained, which was a very viscous colorless liquid. The analysis tabulated hereinbelow showed that it was 2-methyl 2-(o-hydroxybenzyl) coumaran.

Calculated: C percent, 79.96; H percent, 6.71. Found: C percent, 79.63; H percent, 6.70.

The infrared, mass and nuclear magnetic resonance spectra further confirmed the structure of the product. The hydroxy group was determined by acetylation: 0.43 equivalent OH was found for 100 g. of product, the theoretical value is 0.416. A p-nitrobenzoic ester melting at 124°–127° C. was also formed and its analysis indicated a nitrogen content in accordance with the theory:

Calculated: percent N, 3.59. Found: percent N, 3.58.

The yield in the product purified by distillation was 72.5%.

EXAMPLE 2

Preparation of 1,3-di-(o-hydroxyphenyl) 2-methylene propane 20 g. of 1,3-diphenoxy 2-methylene propane, dissolved in 22 g. N-N-dimethylaniline, were heated for 6 hours at 195°–200° C. After heating, dimethylaniline was eliminated by distillation under 1 mm. mercury. The residue was dissolved in hot cyclohexane, and 13.2 g. of crystals (66% yield) which melted at 83° C. were recovered by cooling the solution.

The analysis showed a content of 0.78 hydroxy equivalent for 100 g. of product, and the infrared spectrum confirmed the ortho substitution of the aromatic nuclei. The theoretical hydroxy equivalent of 1,3 di-(o-hydroxyphenyl)2-methylene propane is 0.83.

By evaporating the cyclohexanic solution, 6.8 g. of a very viscous colorless product were obtained and its analysis by chromatography showed that it was mainly formed of a mixture of 1,3-di-(o-hydroxyphenyl) 2-methylene propane and 2-methyl 2-(o-hydroxybenzyl) coumaran.

EXAMPLE 3

By heating 10 g. of 1,3-di-(o-hydroxyphenyl) 2-methylene propane for 4 hours at 200° C., the 2-methyl 2-(o-hydroxybenzyl)coumaran was obtained with a quantitative yield.

EXAMPLE 4

Preparation of 1,3-bis(2-hydroxy 3-methyl phenyl) 2-methylene propane

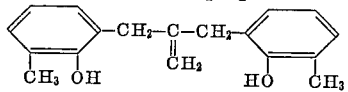

The 1,3-bis(o-methyl phenoxy) 2-methylene propane, prepared from 1,3-dichloro 2-methylene propane and o-cresol, was utilized. This diether was a liquid $Eb_1 = 147° – 157°$ C.

$n_D{}^{20} = 1.560$ $d_4{}^{20} = 1.060$ 20 g. of this diether, diluted by 20 g. N-N-dimethylaniline, was heated for 8 hours at 200°–210° C., then the dimethylaniline was removed by distillation under 1 mm. mercury. The residue was redissolved in 100 cm.³ hot petroleum ether. Upon cooling of this solution, 5 g. of colorless crystals were obtained, melting at 73°–74° C.; the analysis confirmed their structure (determination by acetylation and by infrared spectrometry). The filtered solution was agitated for 2 hours with activated carbon to bleach it, and after which it was concentrated by evaporation, which gave an additional yield of 6 g. of crystallized diphenol, slightly colored in pink. Thus the yield in diphenol reached 55%.

The residual solution still contained diphenol beside the isomeric coumaran, 2,7-dimethyl 2-(2-hydroxy-3-methyl benzyl) coumaran, which had been formed by cyclization.

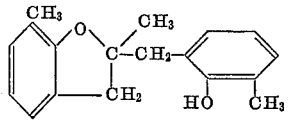

EXAMPLE 5

Preparation of a mixture of 1,3-bis(2-hydroxy 3,6 dichloro phenyl) 2-methylene propane

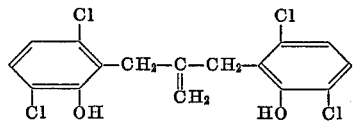

and 4,7 dichloro 2-methylene 2-(2-hydroxy 3,6-dichloro benzyl) coumaran

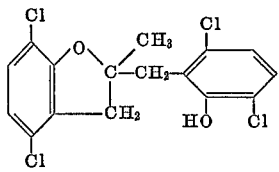

The starting material 1,3-bis-(2-5-di chloro phenoxy) 2-methylene propane, was prepared from 1,3-dichloro 2-methylene propane and 2,5-di-chloro phenol. It was a crystallized colorless product, melting at 78°–80° C., containing 37.9% by weight of chlorine (theory: 37.52).

15 g. of this diether was heated for 7½ hours at 210° C., and thus a mixture viscous at room temperature was obtained, which tended to crystallize. The analysis by thin layer chromatography showed that, beside a slight amount of un-transformed ether, the mixture contained two products which, by infrared analysis and mass spectrometry performed on chromatographic fractions, proved to be diphenol and coumaran indicated hereinabove. Both products were present in approximately equal amounts.

EXAMPLE 6

Preparation of 1,3-bis-(4-hydroxy 3,5-dimethyl phenyl)2-methylene propane

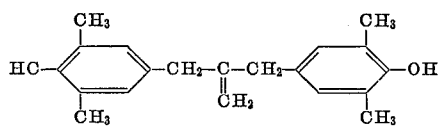

The initial product, 1,3 - bis(2,6-dimethyl phenoxy)2-methylene propane, was prepared from 1,3-dichloro 2-methylene propane and from 2,6-dimethyl phenol. This diether appears as colorless crystals melting at 28°–30° C.

15 g. of this diether, diluted with 15 g. of N,N-dimethylaniline, were heated for 8 hours at 200°–210° C., then the dimethylaniline was eliminated by vacuum distillation. The residue was redissolved in cyclohexane and this solution was stirred up hot with activated carbon. After filtration of the carbon, the solution was cooled and the precipitates thus formed were filtered. 11 g. (73% of the theory) of colorless crystals melting at 114°–115° C. was obtained, which, by analysis, proved to be 1,3-bis-(4-hydroxy 3,5-dimethylphenyl)2-methylene propane.

We claim:
1. A method for isomerically rearranging 1,3 di-(aryloxy) 2-methylene propane of the general formula:

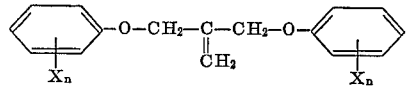

wherein (a) X is selected from the group consisting of alkyl containing 1 to 12 carbon atoms, aryl, alkoxy, hydroxy, formyl, halogen atoms, amine radicals and nitro radicals (b) $n$ is zero or an integer from 1 to 4, and (c) at least one of the ortho positions or the para position in each of the two aromatic rings is occupied by a hydrogen atom and when each of the two ortho positions is occupied by X, the para position is occupied by a hydrogen atom, which method comprises heating said 1,3-di-(aryloxy) 2-methylene propane to a temperature in the range of about 150°–300° C. to promote an isomeric rearrangement thereof to form a compound which conforms to one of the following formulas:

(I) 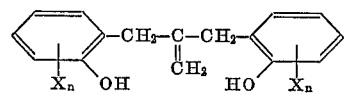

(II) 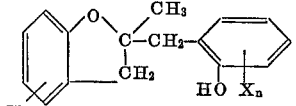

and (III) 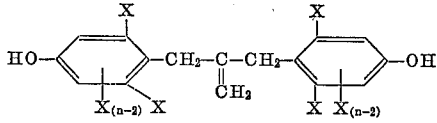

wherein X and $n$ have the same meaning as depicted hereinabove.

2. A method according to claim 1 wherein at least one of the ortho positions in each of the two aromatic rings of the 1,3 di-(aryloxy) 2-methylene propane is occupied by a hydrogen atom and wherein the reaction is carried out in an amine at a pressure sufficient to keep the product in the liquid phase at the reaction temperature range of about 150°–300° C. whereby a phenolic isomer is obtained which conforms to the general formula:

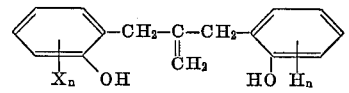

wherein X and $n$ have the same meaning as depicted in claim 1.

3. A method according to claim 2 wherein the phenolic isomer is further treated with an acid whereby a coumaran isomer is obtained which conforms to the formula:

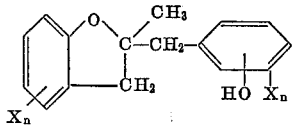

wherein X and $n$ have the same meaning as depicted in claim 1.

4. A method according to claim 2 wherein the phenolic isomer is further heated at a temperature in the range of about 150°–300° C. whereby a coumaran isomer is obtained which conforms to the formula:

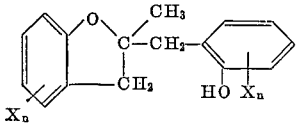

5. A method according to claim 1 wherein at least one of the ortho positions in each of the two aromatic rings of the 1,3-di-(aryloxy) 2-methylene propane is occupied by a hydrogen atom and wherein the reaction is carried out without a solvent whereby a coumaran isomer is obtained which conforms to the general formula:

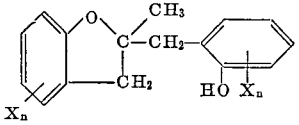

wherein X and $n$ have the same meaning as depicted in claim 1.

6. A method according to claim 1 wherein at least one of the ortho positions in each of the two aromatic rings of the 1,3 di-(aryloxy) 2-methylene propane is occupied by a hydrogen atom and the reaction is carried out in a neutral solvent whereby a coumaran isomer is obtained which conforms to the general formula:

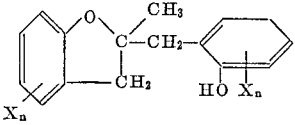

wherein X and $n$ have the same meaning as depicted in claim 1.

7. A method according to claim 1 wherein the ortho positions of the aromatic rings of the 1,3 di-(aryloxy) 2-methylene propane are occupied by X and the para positions are occupied by hydrogen atoms, $n$ is at least two and wherein the reaction is carried out in an amine at a pressure sufficient to keep the products in the liquid phase at the reaction temperature range of about 150°–300° C. whereby a phenolic isomer is obtained which conforms to the general formula:

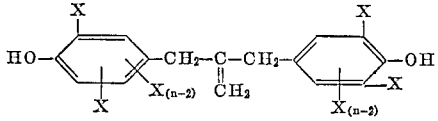

wherein X and $n$ have the same meaning as depicted in claim 1.

8. A phenol conforming to the formula:

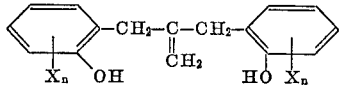

wherein X is a lower alkyl or a chlorine atom, and $n$ is zero or an integer from 1 to 4.

9. A phenol which conforms to the formula:

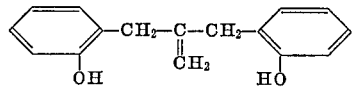

10. A phenol which conforms to the formula:

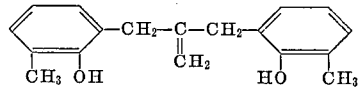

11. A phenol which conforms to the formula:

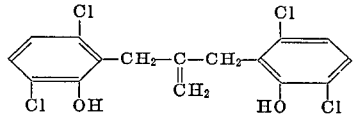

12. A phenol conforming to the formula:

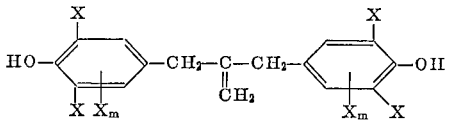

wherein X is a lower alkyl or a chlorine atom, and $m$ is zero or an integer from 1 to 2.

13. A phenol which conforms to the formula:

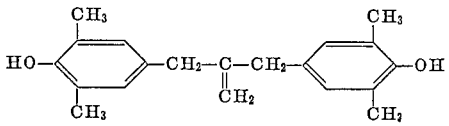

14. A coumaran conforming to the formula

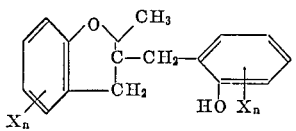

wherein X is a lower alkyl or chlorine atom, and $n$ is zero or an integer from 1 to 4.

15. A coumaran which conforms to the formula:

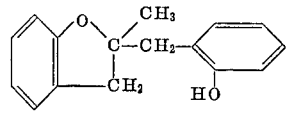

16. A coumaran which conforms to the formula:

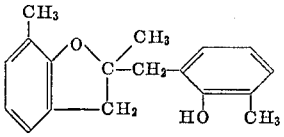

17. A coumaran which conforms to the formula:

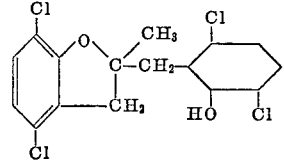

References Cited
UNITED STATES PATENTS
2,548,704   4/1951   Coleman et al. _____ 260—346.2

ALEX MAZEL, Primary Examiner
BERNARD F. DENTZ, Assistant Examiner

U.S. Cl. X.R.
260—47, 75, 77.5, 619